United States Patent [19]

Fock

[11] Patent Number: 4,598,141
[45] Date of Patent: Jul. 1, 1986

[54] PROCESS FOR THE PREPARATION OF POLYESTERS OF IMPROVED DYE AFFINITY

[75] Inventor: Jürgen Fock, Düsseldorf, Fed. Rep. of Germany

[73] Assignee: Th. Goldschmidt AG, Essen, Fed. Rep. of Germany

[21] Appl. No.: 707,058

[22] Filed: Mar. 1, 1985

[30] Foreign Application Priority Data

Mar. 1, 1984 [DE] Fed. Rep. of Germany ....... 3407562

[51] Int. Cl.$^4$ ..................... C08G 63/68; C08G 75/00
[52] U.S. Cl. .................................. 528/293; 528/294; 528/301
[58] Field of Search ...................... 528/293, 294, 301

[56] References Cited

U.S. PATENT DOCUMENTS

| | | | |
|---|---|---|---|
| 3,592,796 | 7/1971 | Trapasso et al. | 528/294 |
| 3,684,768 | 8/1972 | King et al. | 528/302 |
| 3,882,185 | 5/1975 | Radlmann et al. | 528/294 |

*Primary Examiner*—Lucille M. Phynes

*Attorney, Agent, or Firm*—Toren, McGeady, Stanger, Goldberg & Kiel

[57] ABSTRACT

Process for the preparation of polyesters of improved dye affinity by reacting dicarboxylic acids or their reactive derivatives with a mixture of diols, consisting of a predominant amount of an alkylene glycol and 0.1 to 20 weight percent, based on the polyester, of a polyoxyalkylene ether of formula

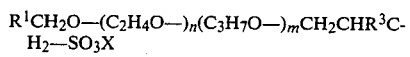

in which

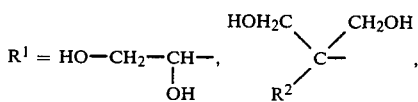

$R^2=CH_3-$, $C_2H_5-$, $C_3H_7-$, $R^3=H-$ or $CH_3$, $X=H-$, alkali or ammonium ion, $n=0$ to 100, $m=0$ to 50 and $n+m$ is not less than 1, and polymers prepared therefrom.

7 Claims, 2 Drawing Figures

PROCESS FOR THE PREPARATION OF POLYESTERS OF IMPROVED DYE AFFINITY

BACKGROUND OF THE INVENTION

1. Field of the Invention

The invention relates to a process for the preparation of polyesters of improved dye affinity by reacting dicarboxylic acids or their reactive derivatives with a mixture of diols, consisting of a predominant amount of an alkylene glycol and, a smaller amount of a polyoxyalkylene ether with two free hydroxyl groups on the starter alcohol.

2. Description of the Prior Art

Polyesters, especially those of terephthalic acid or its dimethyl ester and aklylene glycols with 2 to 10 carbon atoms, are outstandingly suitable for the preparation of fibers. These polyesters are relatively insoluble, chemically inactive, hydrophobic materials. However, these properties cause difficulties when fibers or textile products made from them are dyed. Moreover, adsorption and penetration of the dyes into the fibers are made difficult owing to the fact that the molecules are aligned in a stretched state along the fiber axis and are present in a tightly packed form. To overcome these difficulties during dyeing, the dyeing process is carried out either in the presence of carriers at about 95° C. or according to a high-temperature process at 110° C. to 130° C. in pressure-dyeing equipment. The necessary removal of the carriers after dyeing, however, leads to undesirable contamination of the environment, and the thermal stress to a possible lowering in the mechanical properties and thermal stability of the fibers. Moreover, it is usually impossible to achieve a sufficiently uniform dyeing.

U.S. Pat. No. 3,684,768 discloses a fiber-forming polyester that can be dyed with dispersion dyes, and which is synthesized from dialkylene glycol and terephthalic acid containing 0.25 to 10 mole percent of a modifying agent, based on the recurring polyester unit, of a comonomer having the formula

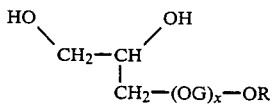

in which G represents the —(CH$_2$)$_2$— or the —(CH$_2$)$_3$— group or a mixture of these groups. R is an alkyl group with 8 to 12 carbon atoms on the average and x has an average value of 8 to 20. In fiber form, the polyesters, so modified, exhibit, for example, increased thermal stability and improved dye affinity. However, the improvement in dye affinity achieved is still insufficient for practical purposes, so that a need still existed for a modifying agent to provide a satisfactory improvement in dye affinity.

SUMMARY OF THE INVENTION

I have discovered a modifying agent for polyesters, which does not adversely affect the mechanical and thermal stability of the polyesters and which significantly improves the dye affinity of polyester articles, especially polyester fibers. More particularly, this novel modifying agent is prepared and incorporated in the polyester by reacting dicarboxylic acids or their reactive derivatives with a mixture of diols, consisting of a greater amount of an alkylene glycol and, from 0.1 to 20 mole percent, based on the polyester of a polyoxyalkylene ether with two free hydroxyl groups on the starter alcohol, the polyester having the formula:

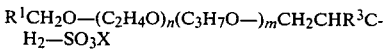

wherein

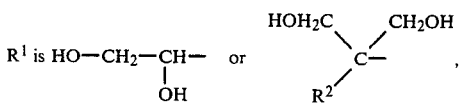

wherein
R$^2$ is CH$_3$—, C$_2$H$_5$—, or C$_3$H$_7$—,
R$^3$ is H— or CH$_3$,
X is H—, alkali or ammonium ion,
n is 0 to 100,
m is 0 to 50, and
n+m is not less than 1.

DESCRIPTION OF THE PREFERRED EMBODIMENT

Figure 1:
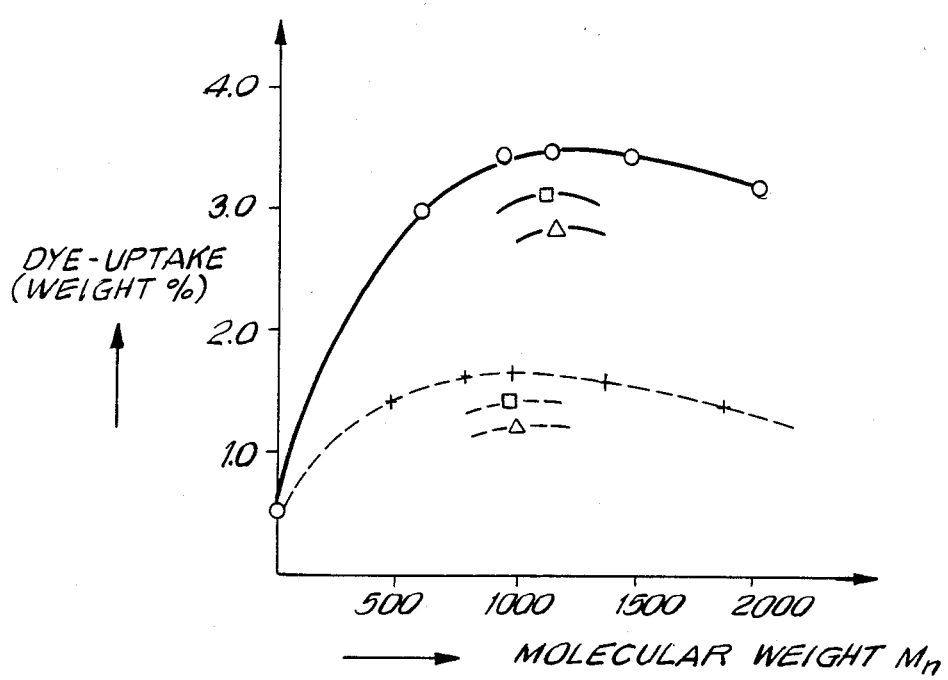
FIG. 1 is a graph showing the variation of dyestuff absorption with molecular weight of diol.

The addition of 1 to 8 weight percent of the polyester is especially preferred.

The products used in the inventive process can be synthesized in a known manner through radical addition of HSO$_3$X to compounds having the formula

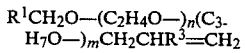

in the presence of catalysts, and, if necessary, at an elevated temperature. The addition reaction is described, for example, in Houben-Weyl "Methoden der organischen Chemie" (Methods of Organic Chemistry), vol. IX, page 380. The use of ammonium hydrogen sulfite is preferred. The radical addition reaction proceeds with a high yield in the presence of atmospheric oxygen and, optionally, at moderately elevated temperatures up to 40° C. The addition reaction can be followed by measuring the decrease in the concentration of double bonds as reflected in the iodine number as well as by elementary sulfur analysis using the Carius method. Sulfurous acid or an acidic alkali salt of sulfurous acid, especially sodium hydrogen, sulfite, instead of ammonium hydrogen sulfite may also be used. Although other metal hydrogen sulfites are also usable, they are generally not used because of their low solubility.

The starting compounds having allyl or methallyl groups are prepared according to the teachings of German Offenlegungsschrift No. 3,025,807. Starting compounds may be glycerin, trimethylolethane, trimethylolpropane or trimethylolbutane. In the process two hydroxyl groups of these compounds are first converted over a period of time at room temperature and in the presence of a drying agent into the corresponding acetal or ketal groups. This is carried out in an acid catalyzed reaction with an aldehyde, such as, for example, formaldehyde, acetaldehyde, propionaldehyde and butyraldehyde, or with a ketone, such as, for example, acetone, methyl ethyl ketone and methyl isobutyl ketone, so that only one reactive hydroxyl group is retained. This hydroxyl group is reacted by an addition reaction in the presence of a basic catalyst, such as, potassium or sodium methylate, under a pressure of 1 to 6 bar and at temperatures of 90° C. to 120° C. under nitrogen with ethylend oxide and/or propylene oxide in amounts such that the conditions for the subscripts n and m, as well as for the sum of n+m are fulfilled. The polyoxyalkylene ether obtained is reacted under nitrogen at 80° C. to 120° C., and with removal of the hydrogen gas or the methanol, with an alkali metal, such as, sodium or potassium or their alcoholates, such as, sodium or potassium methylate, to form the corresponding alkali polyether. The alkali salt is then reacted with allyl or methallyl halide at 70° C. to 100° C. and the alkali halide so formed is removed by filtration, and finally the acetal or ketal is split by the action of an acid, such as, hydrochloric acid, sulfuric acid or phosphoric acid at about 80° C. Through these reactions, the starting material required for the inventive process is obtained.

The process used to synthesize the modifying agent employed in the inventive process can be explained by the following reaction outline:

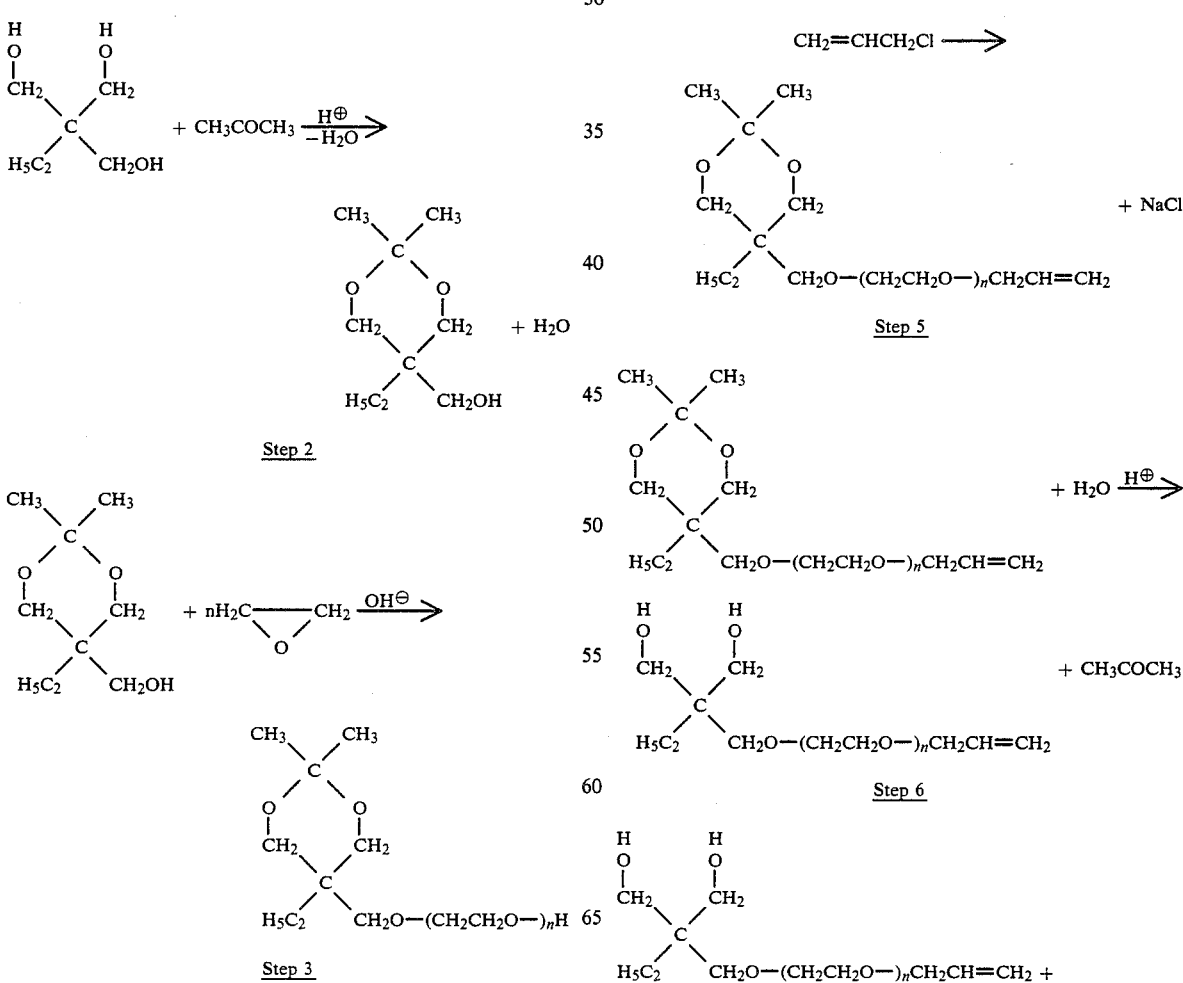

-continued

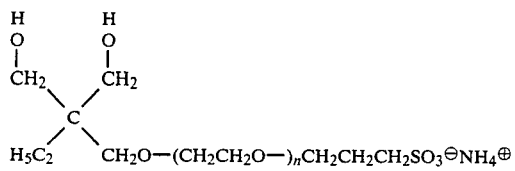

The modified polyether is prepared by methods known from the state of the art. For example, the dicarboxylic acid, the alkylene glycol and the modifying agent can be esterified together and at the same time. The water formed by the reaction is carried off. However, it is also possible to carry out the esterification in a preliminary reaction with the entire amount of the modifying agent, adding the alkylene glycol only after the preliminary reaction has taken place. The modified polyester can then be processed from the melt or from its solution in the usual manner.

The inventively prepared polyester combines outstanding thermal stability with a significantly improved dye affinity. The following example illustrates the invention:

EXAMPLES (A) Preparation of a 1,3-Polyetherdiol (not in accordance with the invention)

Potassium methylate (7 g) is dissolved at 80° C. in 174 g (approximately 1 mole) of 2,2-dimethyl-5-ethylhydroxymethyl-1,3-dioxane in a reactor equipped for forced circulation. After it is carefully flushed with pure nitrogen, the reactor is heated to 110° C. and 880 g (approximately 20 moles) of ethylene oxide is added at a rate, such that the internal temperature of the reactor does not exceed 120° C. and a pressure of 3 bar. After all of the alkylene oxide has been passed into the reactor, the temperature is maintained at 120° C. until a constant pressure indicates the end of the reaction. Residual monomers are then removed under vacuum at 80° C. to 90° C. After the reaction is completed, 50 ml of water are stirred into the product at 80° C. Subsequently, 30 g of a 30% phosphoric acid solution are added and the product stirred for 0.25 hours and then adjusted to pH 7 with $NaH_2PO_4$. The water is then distilled off at 80° C. to 90° C. in a vacuum of 10 torr and the product filtered using 10 g of a silicate-based filter aid.

The hydroxyl number of the product obtained is 59.7 which corresponds to a molecular weight of about 940.

To 940 g (approximately 1 mole) of the polyether obtained, which has been carefully dried once again, 24.2 g (approximately 1.05 moles) of sodium metal are added in small portions at 120° C. under a stream of nitrogen. At the end of this addition, heating is continued for another 2 hours. The product is then cooled to about 50° C. and 80.3 g approximately 1.05 moles) of allyl chloride are added dropwise over a period of ½ hour, after which the temperature is raised once again to 120° C. After the addition of a filter aid the precipitated salt is filtered off.

From the iodine number, determined by the method of Hanus, the conversion of the condensation reaction is estimated to be 98.5% and the hydroxyl number is 1.2.

The ketal ring of the polyether is split by heating the polyether, mixed with 1N hydrochloric acid and ethanol in a weight ratio of 1:1:1, for 8 hours under reflux. At the end of the splitting reaction, the reaction mixture, while still hot, is neutralized with 50% aqueous sodium hydroxide. All volatile components are subsequently distilled off at a temperature between 70° C. and 90° C. and a vacuum of 10 torr. The salt produced is completely removed by warm filtering using a filter aid.

The hydroxyl number of the 1,3-polyetherdiol obtained is 112.

(B) Preparation of a Sulfonated 1,3-Polyetherdiol

The product obtained in (A) (940 g, approximately 1 mole) is dissolved in 1,000 ml of a mixture of 5 parts by weight of water and 1 part by weight of ethanol. A solution of 149 g (approximately 1.5 moles) of ammonium hydrogen sulfite in 300 ml of water, as well as 50 ml of a 25% aqueous solution of ammonia are added with vigorous stirring in the presence of air over a period of 2 hours. After allowing the reaction to continue for a further 2 hours, the water and ethanol are removed at a temperature of 60° C. to 80° C. and vacuum of 10 torr and the precipitated, excess ammonium hydrogen sulfite is filtered off with the help of a filter aid.

The reaction yield, calculated from the iodine number of the product obtained is 90.9%. The reaction yield, calculated from the total sulfur value as determined by the Carius method, is 92.5%. The hydroxyl number, obtained after the ammonium sulfonate was converted into the corresponding sodium sulfonate, is 102.

Various sulfonated, 1,3-polyetherdiols of different molecular weights and based on pure ethylene oxide and propylene oxide were prepared as described in Sections (A) and (B). Data for the 1,3-polyetherdiols obtained, before and after sulfonation, is given in Table 1 below.

TABLE 1

| Polyether No. | Ratio of Ethylene Oxide: Propylene Oxide (wt. %:wt. %) | Molecular Weight Before Sulfonation | Sulfonation Conversion | | Hydroxyl Number After Sulfonation |
|---|---|---|---|---|---|
| | | | from Iodine Number | from Sulfur Content | |
| 1 | 100/0 | 490 | 93.9 | 95.0 | 172 |
| 2 | 100/0 | 780 | 92.0 | 93.2 | 119 |
| 3 | 100/0 | 940 | 90.9 | 92.5 | 102 |
| 4 | 100/0 | 1350 | 89.0 | 90.0 | 74 |
| 5 | 100/0 | 1890 | 86.9 | 89.5 | 51 |
| 6 | 30/70 | 990 | 79.5 | 81.7 | 95 |
| 7 | 70/30 | 1040 | 86.3 | 87.0 | 92 |

(C) Preparation of Polyester Fibers Using Sulfonated and, for Comparison, Unsulfonated 1,3-Polyetherdiols The process, described in "Methoden der organischen Chemie" (Methods of Organic Chemistry), Houben-Weyl, vol. 14/2, page 20, is used to prepare the polyesters. For this preparation, dimethyl terephthalate and a diol mixture of ethylene glycol and the respective, sulfonated 1,3-polyetherdiol (in the form of sodium salt) or the unsulfonated 1,3-polyetherdiol are reacted together after addition of 10 weight percent, based on the starting components, of a 0.2% sodium methylate solution in methanol. Relative to the diester, a 1.6 molar excess of diol mixture was used in each case. The 1,3-polyetherdiols were used in an amount, such that 0 to 8 percent of the theoretical amount of ethylene glycol to be used, was substituted stepwise. Table 2 shows the ratio of ethylene glycol to sulfonated and unsulfonated 1,3-polyetherdiol for various condensation experiments.

(D) Comparative Dyeing Test of the Fibers Obtained

In each case, 1 g of dried fibers is introduced into 40 ml of a dye solution, which is prepared by mixing 0.5 g of a blue dispersion dye based on a monoazo compound [PALANIL ®] and 1 g of a conventional commercial surfactant in 250 ml of deionized water. The vessels containing the fibers and the dye solution are shaken for 2 hours at 95° C. After cooling in an ice bath, 10 ml of the solution is mixed with 90 ml of dimethylformamide. The percentage of dye, absorbed by the fiber material, can be determined by comparing the optical density of this solution with the density of dye solution which has not come into contact with the fibers.

FIG. 1 shows the absorption of dye as a function of the molecular weight of the sulfonated and the unsulfonated 1,3-polyetherdiol in the polyester at a constant concentration of the 1,3-diol of 4 weight percent, based on the polycondensate.

–○– is the curve for the sulfonated 1,3-(polyethylene oxide)-diol.

–+– is the corresponding curve for the unsulfonated 1,3-(polyethylene oxide)-diol.

–□– is the curve for a sulfonated 1,2-(polyethylene oxide/polypropylene oxide)-diol with an ethylene oxide to propylene oxide ratio of 30:70 weight percent.

–△– is the curve for a sulfonated 1,3-(polyethylene oxide/polypropylene oxide)-diol with an ethylene oxide to propylen oxide ratio of 70:30 weight percent.

–▭– is the curve for an unsulfonated 1,3-(polyethylene oxide/polypropylene oxide)-diol with an ethylene oxide to propylene oxide ratio of 30:70 weight percent.

–△–is the curve for an unsulfonated 1,3-(polyethylene oxide/polypropylene oxide)-diol with an ethylene oxide to propylene oxide ration of 70:30 weight percent.

Figure 2:
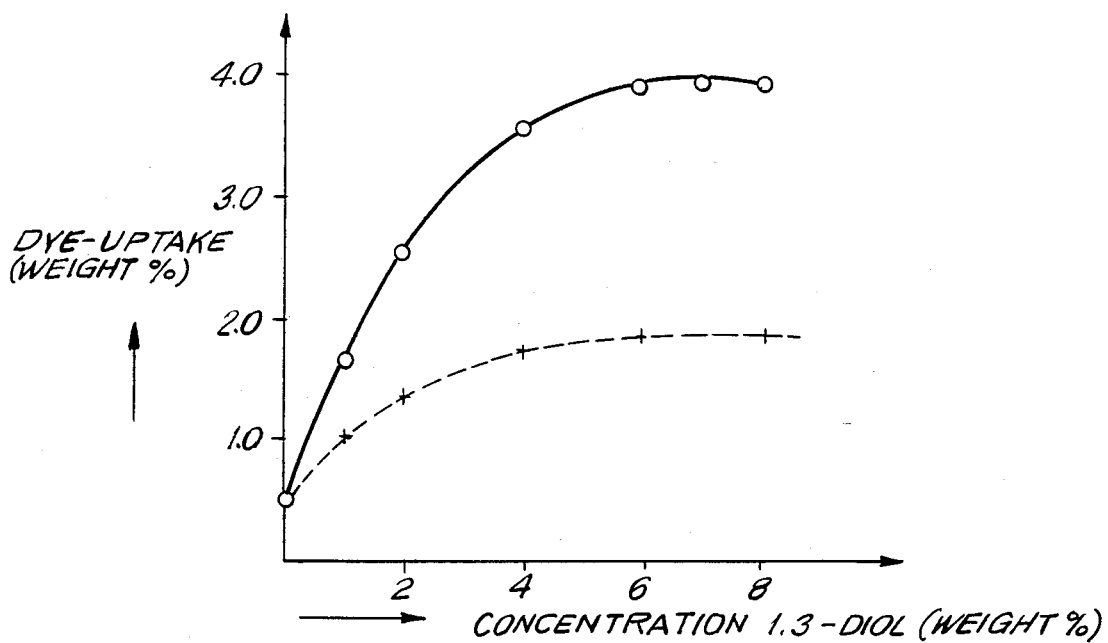
FIG. 2 is a graph showing the variation of dyestuff with concentration of diol.

FIG. 2 shows the absorption of the dye as a function of the concentration of 1,3-diols with and without sulfonate groups with molecular weight of approximately 1000. The improvement in dye affinity brought about by the sulfonated 1,3-diols can be clearly seen. The dye affinity is at an optimum in the molecular range from 1,000 to 1,500. The increased uptake of dye is already very pronounced when the 2 weight percent 1,3-diol is present. The effect of unsulfonated 1,3-diols in the polyester fibers is also noticeable, but less pronounced.

TABLE 2

| Trial No. | Ethylene Glycol (g) | Sulfonated 1,3-polyetherdiol No.*/(g) | Not Sulfonated 1,3-polyetherdiol No.*/(g) |
|---|---|---|---|
| 1 | 99.0 | — | — |
| 2 | 96.5 | 1/2.5 | — |
| 3 | 96.5 | — | 1/2.5 |
| 4 | 96.5 | 2/2.5 | — |
| 5 | 96.5 | — | 2/2.5 |
| 6 | 96.5 | 3/2.5 | — |
| 7 | 96.5 | — | 3/2.5 |
| 8 | 96.5 | 4/2.5 | — |

TABLE 2-continued

| Trial No. | Ethylene Glycol (g) | Sulfonated 1,3-polyetherdiol No.*/(g) | Not Sulfonated 1,3-polyetherdiol No.*/(g) |
|---|---|---|---|
| 9 | 96.5 | — | 4/2.5 |
| 10 | 96.5 | 5/2.5 | — |
| 11 | 96.5 | — | 5/2.5 |
| 12 | 96.5 | 6/2.5 | — |
| 13 | 96.5 | — | 6/2.5 |
| 14 | 96.5 | 7/2.5 | — |
| 15 | 96.5 | — | 7/2.5 |
| 16 | 97.75 | 3/1.25 | — |
| 17 | 97.75 | — | 3/1.25 |
| 18 | 95.3 | 3/3.7 | — |
| 19 | 95.3 | — | 3/3.7 |
| 20 | 94.0 | 3/5.0 | — |
| 21 | 94.0 | — | 3/5.0 |

*Polyether No. from Table 1

What is claimed is:

1. A process for the preparation of polyesters with improved dye affinity which comprises reacting a dicarboxylic acid with a mixture of diols, said mixture comprising a major portion of an alkylene glycol and from 0.1 to 20 weight percent, based on the polyester, of a polyalkylene ether having the formula:

$$R^1CH_2O-(C_2H_4O-)_n(C_3H_7O-)_mCH_2CHR^3CH_2-SO_3X$$

wherein

R$^1$ is 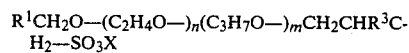, or 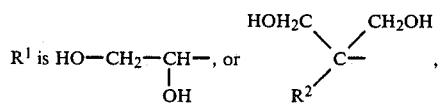, wherein
R$^2$ is $CH_3-$, $C_2H_5-$, or $C_3H_7-$,
R$^3$ is $H-$ or $CH_3$,
X is $H-$, alkali or ammonium ion,
n is 0 to 100,
m is 0 to 50, and
n+m is not less than 1.

2. The process in claim 1 wherein the amount of polyoxyalkylene ether is from 1 to 8 weight percent.

3. A polyester having improved dye affinity prepared by reacting a dicarboxylic acid with a mixture of diols, said mixture comprising a major portion of an alkylene glycol and from 0.1 to 20 weight percent, based on the polyester, of a polyalkylene ether having the formula:

$$R^1CH_2O-(C_2H_4O-)_n(C_3H_7O-)_mCH_2CHR^3CH_2-SO_3X$$

wherein

R$^1$ is 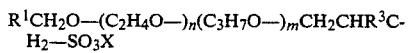, or 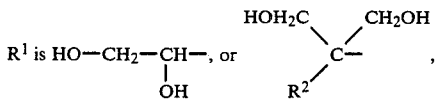, wherein
R$^2$ is $CH_3-$, $C_2H_5-$, or $C_3H_7-$,
R$^3$ is $H-$ or $CH_3$,
X is $H-$, alkali or ammonium ion,
n is 0 to 100,
m is 0 to 50, and
n+m is not less than 1.

4. The polyester of claim 3 wherein the amount of polyoxyalkylene ether is from 1 to 8 weight percent.

5. A fiber formed from the polyester of claim 3.

6. An article formed from the polyester of claim 3.

7. The polyester of claim 3 which is dyed.

* * * * *